United States Patent
Bozicevich et al.

(10) Patent No.: US 10,802,745 B1
(45) Date of Patent: Oct. 13, 2020

(54) PROCESS CONTROL AND DATA ACCESS FOR PRE-TRANSITIONAL, TRANSITIONAL, AND POST-TRANSITIONAL TRANSFER

(71) Applicant: Wells Fargo Bank, N.A., San Francisco, CA (US)

(72) Inventors: Jay Michael Bozicevich, Golden Valley, MN (US); Alan W. Hecht, San Francisco, CA (US); Latson Li, South San Francisco, CA (US); Mahendra Sarvottam Telang, Pleasanton, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 420 days.

(21) Appl. No.: 15/636,609

(22) Filed: Jun. 28, 2017

(51) Int. Cl.
*G06F 3/06* (2006.01)

(52) U.S. Cl.
CPC .......... *G06F 3/0647* (2013.01); *G06F 3/0605* (2013.01); *G06F 3/0637* (2013.01); *G06F 3/0653* (2013.01)

(58) Field of Classification Search
CPC .... G06F 3/0647; G06F 3/0605; G06F 3/0637; G06F 3/0653
USPC .......................................................... 705/35
See application file for complete search history.

(56) References Cited

U.S. PATENT DOCUMENTS

| 7,584,131 B1* | 9/2009 | Kurtz | G06Q 10/06 |
| | | | 705/36 R |
| 2005/0210320 A1* | 9/2005 | Vincent | G06F 11/2071 |
| | | | 714/11 |
| 2006/0069607 A1* | 3/2006 | Linder | G06Q 10/063 |
| | | | 705/7.11 |
| 2007/0033211 A1* | 2/2007 | Berman | G06Q 10/10 |
| 2008/0270314 A1* | 10/2008 | Birney | G06Q 30/06 |
| | | | 705/80 |
| 2008/0275750 A1* | 11/2008 | Robinson | G06Q 40/06 |
| | | | 705/35 |

(Continued)

OTHER PUBLICATIONS

Berger, Sarah. "Keeping Track of Your Data is Getting Harder to Do," Bankrate.com, Aug. 18, 2016. https://www.bankrate.com/finance/identity-theft/consumer-data-company-acquisition.aspx (Year: 2016).*

(Continued)

*Primary Examiner* — Robert R Niquette
(74) *Attorney, Agent, or Firm* — Schwegman Lundberg & Woessner, P.A.

(57) ABSTRACT

A computer-implemented system and method are provided for process control during a transfer of an entity from a transferor system to a transferee system. The method comprises, in a pre-transition state, storing data of a user in the memory comprising combined non-divested data that remain with the transferor, and to-be divested data that are a part of the entity and remain with the entity during and after the transfer. In a transitional state, the method provides full access to the user data by the transferor, provides additional limited access to the to-be divested data by the transferee, receives required new access credentials permitting the user to access the to be divested data, and partially restricts access to the to-be divested data. In a final state, the method divests the to-be divested data, making it divested data, and removes access to the divested data by the transferor.

26 Claims, 6 Drawing Sheets

(56) References Cited

U.S. PATENT DOCUMENTS

| | | | | |
|---|---|---|---|---|
| 2009/0037488 A1* | 2/2009 | Abrams | ............... | G06F 16/258 |
| 2011/0204138 A1* | 8/2011 | Ukuda | .................. | G06Q 40/02 |
| | | | | 235/379 |
| 2015/0370505 A1* | 12/2015 | Shuma | ................. | G06F 3/0604 |
| | | | | 711/165 |
| 2016/0140652 A1* | 5/2016 | Ghosh | ................... | G06Q 40/02 |
| | | | | 705/35 |

OTHER PUBLICATIONS

Singer, Natasha et al. "When a Company is Put Up for Sale, in Many Cases, Your Personal Data Is, Too," The New York Times, Jun. 28, 2015. https://www.nytimes.com/2015/06/29/technology/when-a-company-goes-up-for-sale-in-many-cases-so-does-your-personal-data.html (Year: 2015).*

* cited by examiner

PROCESS CONTROL AND DATA ACCESS FOR PRE-TRANSITIONAL, TRANSITIONAL, AND POST-TRANSITIONAL TRANSFER

TECHNICAL FIELD

Described herein is a system and method for process control and data access related to the transfer of an entity of the system as the system transitions through pre-transitional, transitional, and post-transitional transfer stages.

BACKGROUND

When transferring an entity that requires proper access control of a complex system to an external system, it may be difficult to ensure that proper access is maintained between the systems while at the same time ensuring a smooth transition. This is particularly true when the transfer involves multiple stages and includes common entities that are split as a result of the transfer.

SUMMARY

Disclosed herein is a computer-implemented method for process control during a transfer of an entity from a system of a transferor to an external system of a transferee. The method comprises, in a pre-transition state, storing data of a user in the memory comprising combined non-divested data and resources that are to remain with the transferor, and to-be divested data and resources that are a part of the entity and are to remain with the entity during and after the transfer. The non-divested data and to-be divested data are segregated utilizing flags in the memory, providing full access to the user data by the transferor and the user, and providing limited access to the to-be divested data and resources by the transferee. The method further comprises, in a transitional state, providing full access to the user data by the transferor, providing additional limited access to the to-be divested data and resources by the transferee, receiving from the user required new access credentials permitting the user to access the to be divested data, and partially restricting access to at least one of the to-be divested data and resources by the user. This occurs while providing full access to the non-divested data and resources. In a final state, the method comprises divesting the to-be divested data and resources, making it divested data, and removing access to the divested data and resources by the transferor.

Disclosed herein is also a system for process control during a transfer of an entity from a system of a transferor to an external system of a transferee. The system of the transferor comprises a hardware processor, a storage device connected to the hardware processor. In a pre-transition state, the system comprises stored data of a user in the memory comprising combined non-divested data and resources that are to remain with the transferor, and to-be divested data and resources that are a part of the entity and are to remain with the entity during and after the transfer. The non-divested data and to-be divested data are segregated utilizing flags in the memory. The system, during the pre-transition state, provides full access to the user data by the transferor and the user, and provides limited access to the to-be divested data and resources by the transferee. In a transitional state, the system provides full access to the user data by the transferor, provides additional limited access to the to-be divested data and resources by the transferee, receives from the user required new access credentials permitting the user to access the to be divested data, and partially restricts access to at least one of the to-be divested data and resources by the user while providing full access to the non-divested data and resources. In a final state, the system divests the to-be divested data and resources, making it divested data, and removes access to the divested data and resources by the transferor.

A non-transitory computer-readable storage medium is also provided that includes instructions that, when executed by a processor, cause the processor to execute the method procedures described above.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Complex networked systems that are designed to accommodate large numbers of users with diverse access rights to related data and processes may be difficult to manage. This is particularly true when a significant change is made to the system. When a change is made that significantly alters access rights to data and processes within the system, care must be taken to properly transition access to data and procedures with minimal disruption. When the change involves a transitioning of particular users and associated resources from a current system to another (possibly external) system, maintaining a continuity of access to important data and processes may become a technical challenge when a full transition is too complex to occur at a single point in time.

Described herein are various systems and methods that can accommodate a change involving transitioning a large number of users with their associated data and resources from a current system to one or more external systems while preserving the users' access to their data and resources and maintaining security throughout the transition.

The discussion below focuses on a particular implementation involving a banking system. However, the fact that this implementation relates to a system involving the business of banking does not detract from the technical issues addressed by the novel system nor the technical solution disclosed herein. The technical concepts provided here may be generalized to other systems dealing with similar issues of maintaining data access and integrity for large, complex systems undergoing a change throughout the transition from a beginning state to an end state.

The implementation described herein is a banking system in which various users and their associated resources are being sold from a current owner to one or more new owners. An event, knows as a "Portfolio Sale" is defined as a sale of a portfolio of accounts based on their geography (region) along with a support structure for the accounts. The United States could be broken up into a number of regions, each comprising a number of states for example, a South Region comprising New Mexico, Texas, Oklahoma, Arkansas, and Louisiana, and a North Region comprising North Dakota, South Dakota, Iowa, Minnesota, and Wisconsin.

In the event of a Portfolio Sale, the systems and methods described herein may help to ensure the continued servicing of customers and accounts on behalf of third party purchasers. This continued servicing includes functionality and access to ensure ongoing customer and account servicing for divested entities. As the separation moves through different stages, levels of access to information and other resources are modified with respect to the involved parties.

Various terminology will be used to discuss the system as it transitions through the different stages. The transferor is defined as the entity that is the origin of the transfer this entity may also be considered a seller. The transferee is defined as the entity that is the end point of the transfer this entity may also be considered a buyer. An example of a transferee is a financial institution, such as a banking company. The transferring entity is defined as the entity that moves from the transferor to the transferee.

The stages transitioned through in the implementation described below may span months or years. However, in certain other technical fields involving state transitions, the stages could span much briefer times, even into the microsecond range or less, depending on the various entities involved and their relationships and supporting infrastructure to one another. A first stage of relevance is a point at which it is decided to initiate a transition. In the present implementation, this may be a decision to sell accounts of banks in a particular region or having some form of delineating attribute (e.g., accounts of a particular type). Once the decision has been made, the transferor puts up an offer to sell. Customer accounts may be associated with the state in which they were originally opened. Entire regions may be offered for divestiture, either together or separately by state (except for certain groups, such as Commercial Lending and Commercial Real estate whose customers can span multiple states). Once the transferor has reached a definitive agreement with one or more transferees, the status of the transferring entity changes to pre-close.

Figure 1A:
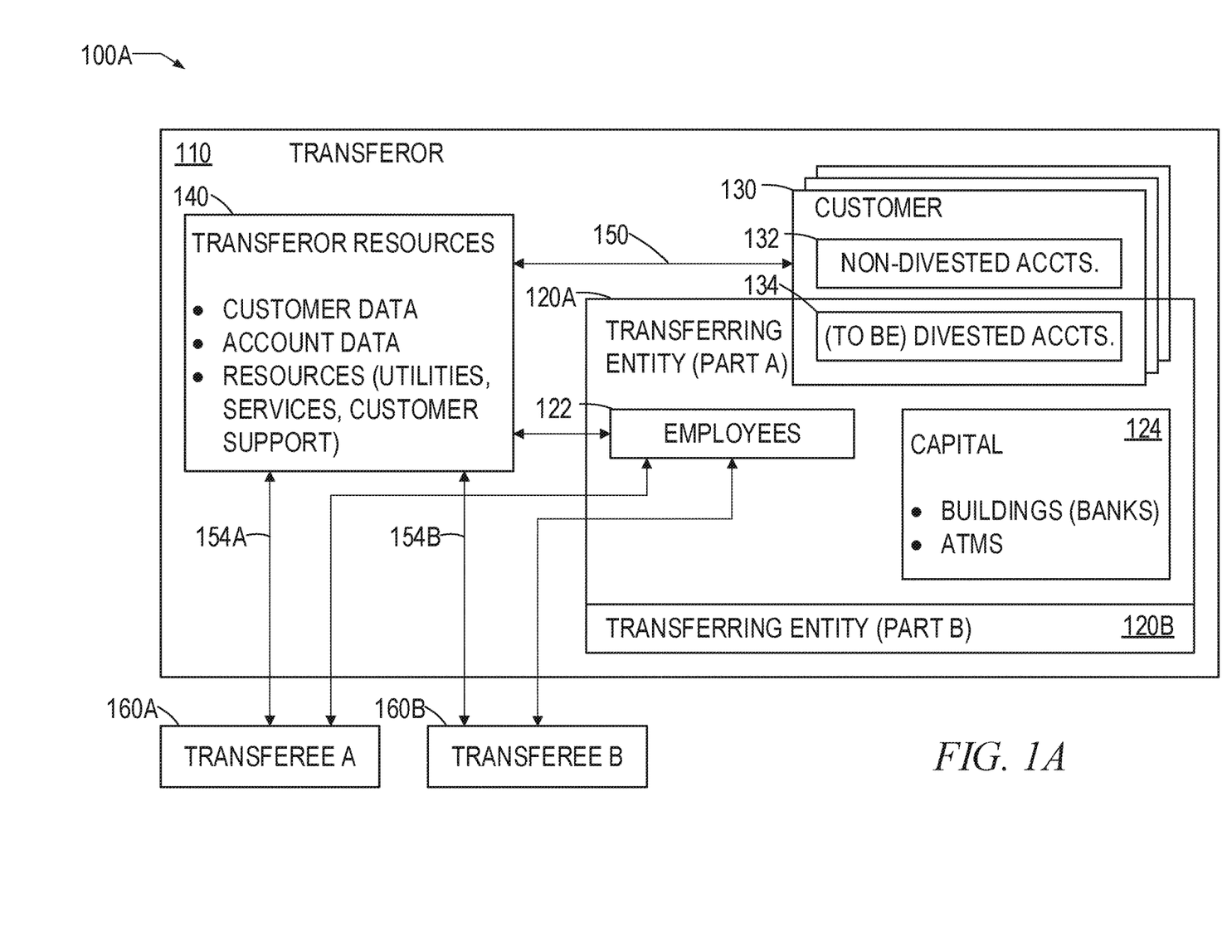
FIG. 1A is a block diagram illustrating an implementation of a pre-close state of the system, according to an aspect.

FIG. 1A is a block diagram illustrating an implementation of the pre-close state of the system 100A. The transferor 110, which may be a bank, has two transferring entities: transferring entity part A 120A, which may be a regional bank branch and transferring entity part B 120B (which is similar to transferring entity, part A 120A, but not shown in detail for the sake of simplicity) which are to be respectively transferred to (prospective) transferee A 160A and (prospective) transferee B 160B. The A and B on the reference characters may be omitted below when referring to an element collectively as a group or representatively as an arbitrary selection. The systems of the transferees 160A, 160B may be the same or similar to the system shown of the transferor 110, or they may vary in composition.

FIG. 1A shows customers 130 (which may also be referred to herein as users) that are split across the transferring entity 120. This represents the fact that a single customer 130 may have multiple accounts: some that are not to be divested (non-divested accounts 132) and remain with the transferor 110, and those that are to be divested 134 and will move to the transferee 160. The transferring entity 120 may have employees 122 and capital 124 that may include physical buildings and structures, such as banks and automated teller machines (ATMs), and other forms of capital. The capital 124 and information related to the employees 122 may constitute the support structure for the transferring entity 120 (regionally defined portfolio of accounts). At the pre-close state, the customer and account data along with access to resources may remain with the transferor resources 140. The customer 130 can still access information about both non-divested 132 and (to be) divested 134 accounts and related resources through an interface 150. Similarly, employees 122 of the transferring entity 120 can still access relevant information associated with the transferring entity 120 located in the transferor resources 140 in a manner that they have always been able to in the past. In one implementation, the employees 122 of the transferring entity 120 may be identified during the pre-close stage, and then, at the transition stage, terminated and rehired as contractors.

However, in order to allow the transferees 160 to review relevant information, in the pre-close state, information related to the transferring entity 120 that is maintained in the transferor resources 140 may be accessed through interfaces 154A, 154B for the respective transferees 160A, 160B. The interface 154 may be provided in the form of a Virtual Data Room (VDR) that is populated with valuation (and other relevant) information for the affected accounts. The (prospective) transferees 160 and transferor 110 may put information into the VDR and may access information based on a limited level access to the VDR for information and analysis specific to conducting valuation of assets and buyer due diligence. The VDR may comprise two components, a first of which is an information request list that outlines the type of information that needs to be assembled, and a second of which is the content that satisfies the information requests. Data provided in the VDR may include financial reports (including assets and liabilities), policies and procedures, information about the workforce and operations, and descriptions of the business and its strategy. The transferor 110 corporate development team may work with the transaction partners of the transferring entity 120 and the transferee 160 representing subject matter expertise across various functional roles in the organization (e.g., human resources (HR), technology and operations, controllers, tax, and legal). The access may be limited to that necessary for an entity to perform the required functions.

The VDR may comprise: 1) a database of information request records used to manage the categorization and fulfillment of content for each contemplated divestiture action; 2) a workflow to manage information request records and the content fulfillment process for each contemplated strategic resolution action; and 3) reporting and (filtered) views to help guide relevant reviewers or regulators through their content review for a strategic resolution action.

Once due diligence is complete and the sale is contracted, pre-designated scripts may be distributed to both branch and contact center staff associated with the transferor 110 and transferring entity 120. Communications to team members of the transferor 110 and the transferring entity 120 may be conducted to ensure consistent customer service relevant to the divested accounts 134 at the time of divestiture.

In sum, during the pre-close state, the transferor 110 may support, among other things, the due diligence process, review a preliminary population of accounts regarding those to be divested and those to remain, and support a population of valuation information into the VDR Once the sale is contracted for a particular transferring entity 120, by region or state, a state of Pre-Close Lock may include the following steps: 1) Transition Services Agreements (TSAs) may be set up with the transferees 160. These TSAs dictate operative terms between the parties during the transition state. 2) All divested accounts 134 which are part of the sale may be identified within a Systems of Record in anticipation of setting a divestiture flag indicating that the account 134 is ready for transition. The divestiture flag could be as simple as a bit associated with the account data of the transferor resources 140, or it could contain a link to (or copy of) relevant information about the transferee 160, scheduling, etc. A flag, as defined herein, is to be construed broadly and may include any mechanism or process that allows a distinction between two states: flagged and non-flagged. Flags may be incorporated in and associated with customer identity, divested accounts (at the account level), buyers and dates. 3) Customer and product data in the transferor resources 140 may be used to prepare for the impact of certain actions, such as a severing of linkages between accounts (e.g., overdraft protection). 4) Communications may be sent to customers 130 outlining a sequence of transition activities and a timeline. 5) Team member access changes to data may initiated, including team members of the transferor 110, the transferring entity (employees 122), and team members of the transferees 160.

The securing and access control to information may utilize a variety of tools and mechanisms to ensure that only people with proper authority can take authorized actions with respect to the systems, services, and data. A customer's 130 identity can be verified by the use of passwords, biometric identification, voice recognition, secure keys, etc. Furthermore, a user can be assigned to one or more groups that designate access authority based on group membership. Secure access at a network and/or computer level may be provided, as well as at an application level, to ensure that a particular risk level for unauthorized access is within some predefined bounds. The access accorded to the various system components can be the subject of checks and balances to minimize the possibility of human error allowing unauthorized access. Logging mechanisms may be utilized to detect if/when such unauthorized accesses occur so that holes in the system can be rapidly, fixed.

The access changes and channel functionality may be defined and enabled for divested 134 and non-divested 132 customer accounts including branch offices, ATMs, and Internet transactions. Various products within the core banking products that may be divested may be supported during the transition may include, but are not limited to: Consumer Deposits, Consumer Credit Cards, Business Deposits, Personal Lines & Loans, Home Equity Lines of Credit, Mortgage/Home Lending, Business Direct Lending, Commercial Real Estate, Business Lending, Commercial Banking, and Safe Deposit Box. The transition period may span a time from due diligence to de-conversion (discussed below) from the transferor's 110 systems.

The following case study illustrates these principles in a concrete way. The Smiths are a family comprising Barbara and Tim (parents) living in Texas with their two children. The parents have a consumer deposit account, a personal line, and a Mortgage. Barbara has her own business, "Flowers R Us", which has a business deposit account and a business direct lending loan. Their son Peter attends school in Minnesota where he opened a consumer deposits account that is linked to his parents' consumer deposit account.

Texas is being divested as part of the larger South Region. In that case, Tim and Barbara's personal accounts are flagged for divestiture together with the Flowers R Us business accounts. Since Peter's checking account was opened in Minnesota, which is outside the South region, it is not flagged for divestiture. The system is able to determine, based on the flagging in the database, the owners of the accounts 134 facing divestiture, and can automatically prepare form letters by accessing the customer data associated with the account notifying Tim and Barbara of the upcoming divestiture of all their affected transferor 110 accounts 134, with, for example, an explanation of the actions to follow and relevant effective dates. Flowers R Us may be notified separately by letter of the upcoming divestiture of their transferor 110 business accounts 134, with a similar explanation of relevant actions and effective dates. Peter does not receive a communication nor does he see any immediate change in his banking experience since he is not a part of the regional divestiture. During the Pre-Close state/timeframe, all of the Smiths may continue to interact as usual with their local Branches, ATMs, Contact Center, Mobile Banking, and Internet services. A pre-transition state is defined herein to include the pre-close and pre-close lock states.

The pre-close lock state may include the transferor 110, among other things, obtaining a list of divested accounts 134, flagging accounts as divested 134 or non-divested 132 to activate a pre-defined workflow for each account profile, initiate customer communication related to divested accounts 134, and initiating team member access changes.

Figure 1B:
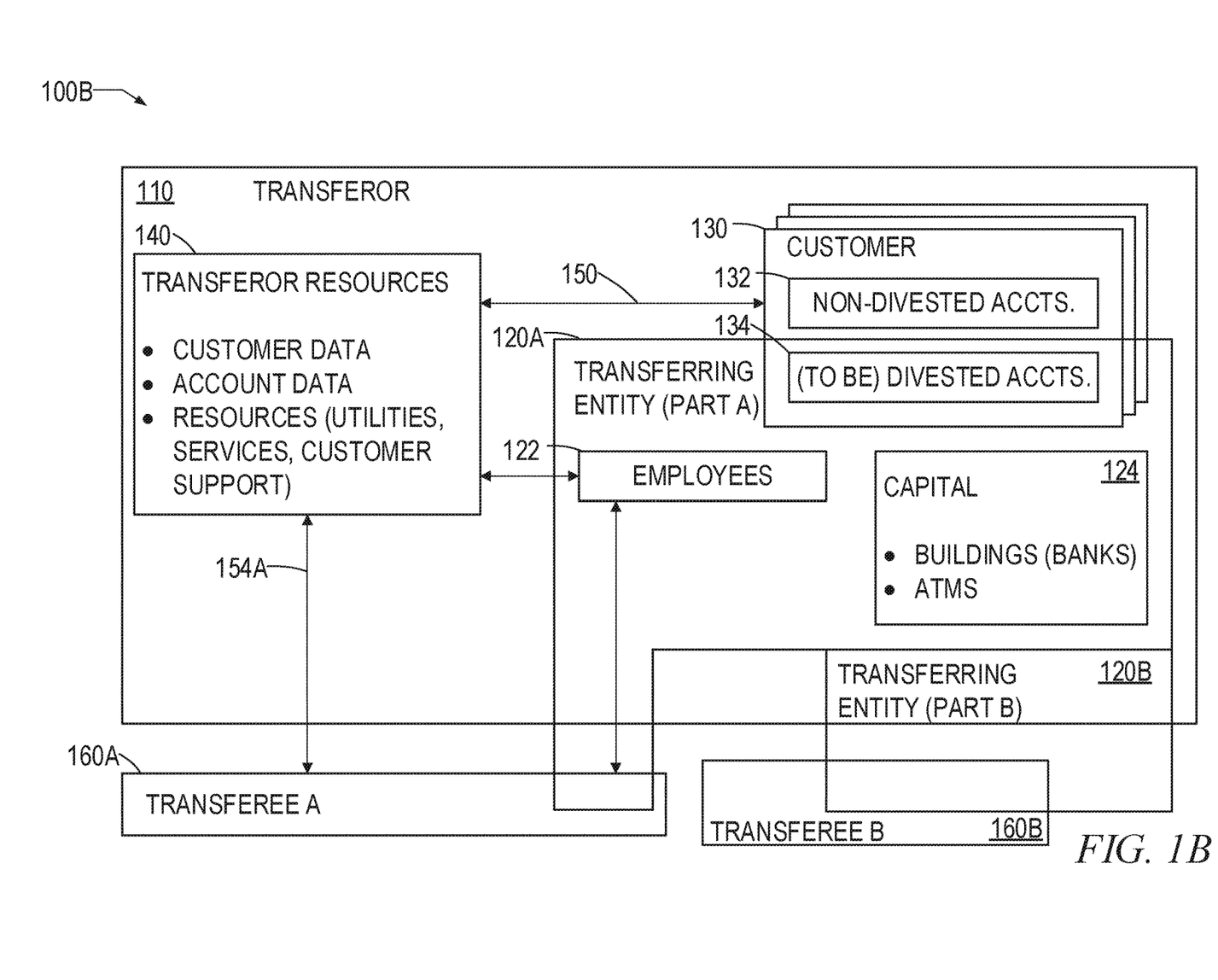
FIG. 1B is a block diagram illustrating an implementation of the transition state of the system, according to an aspect.

FIG. 1B is a block diagram illustrating an implementation of the transitional state of the system 100B (also referred to herein as the transitional servicing period). The transitional state may be triggered when, for example, a contract is signed and a file of accounts to be sold is received. The file may be used to flag the accounts as pre-close lock and to initiate customer communications. At the start of the transitional state (e.g., sale close, defined as a start of the TSA), the account flag is flipped to indicate the account as divested, starting day 1 of the TSA.

Descriptions of the elements discussed in FIG. 1A are not repeated here, and some of the links illustrated for transferring entity part B 120B and transferee B 160B are not shown for the sake of clarity. While in this state, the TSAs provide the operative framework for the entities involved.

The overlap of transferring entity part A 120A with transferee A 160A, and the overlap of transferring entity part B 120B with transferee B 160B, as illustrated in FIG. 1B indicates that the ownership, access rules, and data organization differs from that of FIG. 1A, as established by the TSAs. During the transitional servicing period, the transferor 110 continues to service the non-divested accounts 132, and the transferee 160 will be able to access their acquired (the divested) accounts 134. The account-level flagging of the divested accounts 134 and the related customer records facilitate a clear delineation of responsibilities between the transferor's 110 and transferee's 160 customer service activities according to the TSA.

Thus, in various implementations of the system described herein, the transferor 110 may act as the service provider, depending on terms of the TSA on behalf of the transferee 160. These capabilities can leverage the transferor's 110 existing systems of record, middleware, channels, and infrastructure in place. At the same time, data privacy and integrity is maintained so that the acquiring transferee(s) 160, e.g., transferee A 160A, may see and service their customers and accounts and get appropriate financials for their transferring entity 120, e.g., transferring entity part A 120A, but not those of the transferor 110 or of other acquiring entities, such as transferee B 160B.

These implementations may leverage an enterprise integrated environment of the transferor 110. Within the integrated environment, sold customers and accounts (the transferring entities 120), may be flagged as divested but may continue to be serviced and maintained in a same business as usual processes (dependent upon the ISA). Customer and account data are logically separated by the transferee 160, ensuring that access by team members (of the transferor 110, the transferring entity 120, and the transferee 160) and customers 130 is limited to what is appropriate. This approach may avoid an abrupt experience transition to the customer 130 for their divested accounts 134, and furthermore, it is flexible in that it does not pre-suppose what states or regions are sold together and allows for any combination of sales at a state level. Additionally, multiple TSAs with multiple transferees 160 may all be operative at the same time.

During the transitional state, the transferor 110 may provide data to the transferee 160 regarding the divested accounts 134. For example, daily transactions associated with the divested accounts 134 can be sent to the transferee 160, thus providing the transferee 160 with daily extracts containing daily transaction details. Such transactions may include, among other things, deposits, withdrawals, balance inquiries, and/or cashed checks. The timing of such conversions and transfers could occur on any other timing period or can be associated with any type of event.

Returning to the use case described above, in the transition period, Peter, who holds a non-divested account 132, sees no change in his banking experience. He continues to interact with the transferor 110 as in the past. For Tim and Barbara who hold divested accounts 134, their original banking portal credentials still allow them to view Peter's information as part of their linked accounts. When logging into the banking portals of the transferor 110 for the first time after the start of the transition period, Tim and Barbara may be required to establish new credentials for accessing their divested accounts 134, since their access status has now been changed. When they use the new credentials, in one implementation, they no longer see the transferor's 110 branding and may need revise various services, such as rescheduling transfers and bill pay instructions.

Certain transferor services may still be provided by the transferor 110 during this stage on the divested accounts 134. For example, Tim and Barbara may be able to withdraw, deposit, transfer and inquire on their accounts at divested ATMs (part of the transferring entity capital 124). However, certain other services may be restricted with regard to the divested accounts 134, For example, they may not be able to change their personal identification number (PIN) at an ATM, and may have to do so using the transferor's 110 Contact Center, Interactive Voice Response, or possibly use services of a divested Branch of the transferee 160. Tim and Barbara may not be issued new debit cards, but may be able to request a new one in the case of lost or stolen cards. The Smiths may interact with the transferor's 110 ATMs in the same way as any other non-customer and can withdraw funds, transfer funds, and perform a balance inquiry. This division and limitation of services discussed above is by example only, and any division scheme may be utilized.

During the transitional state, the transferor 110 may continue servicing of divested accounts 134, produce financial reporting for each transferee 160, continue monitoring compliance with required regulations, and execute provisioning of divested and non-divested team member access.

The transferee 160, while not servicing the divested accounts 134, may be selling (on their own platform if one is in place) and servicing new accounts sold to the customers. Additionally, during the transitional state, the transferee 160 may begin working with the transferor 110 in preparation for the eventual de-conversion of the divested customer and account information so that it can be converted/added to the systems of the transferee 160.

Figure 1C:
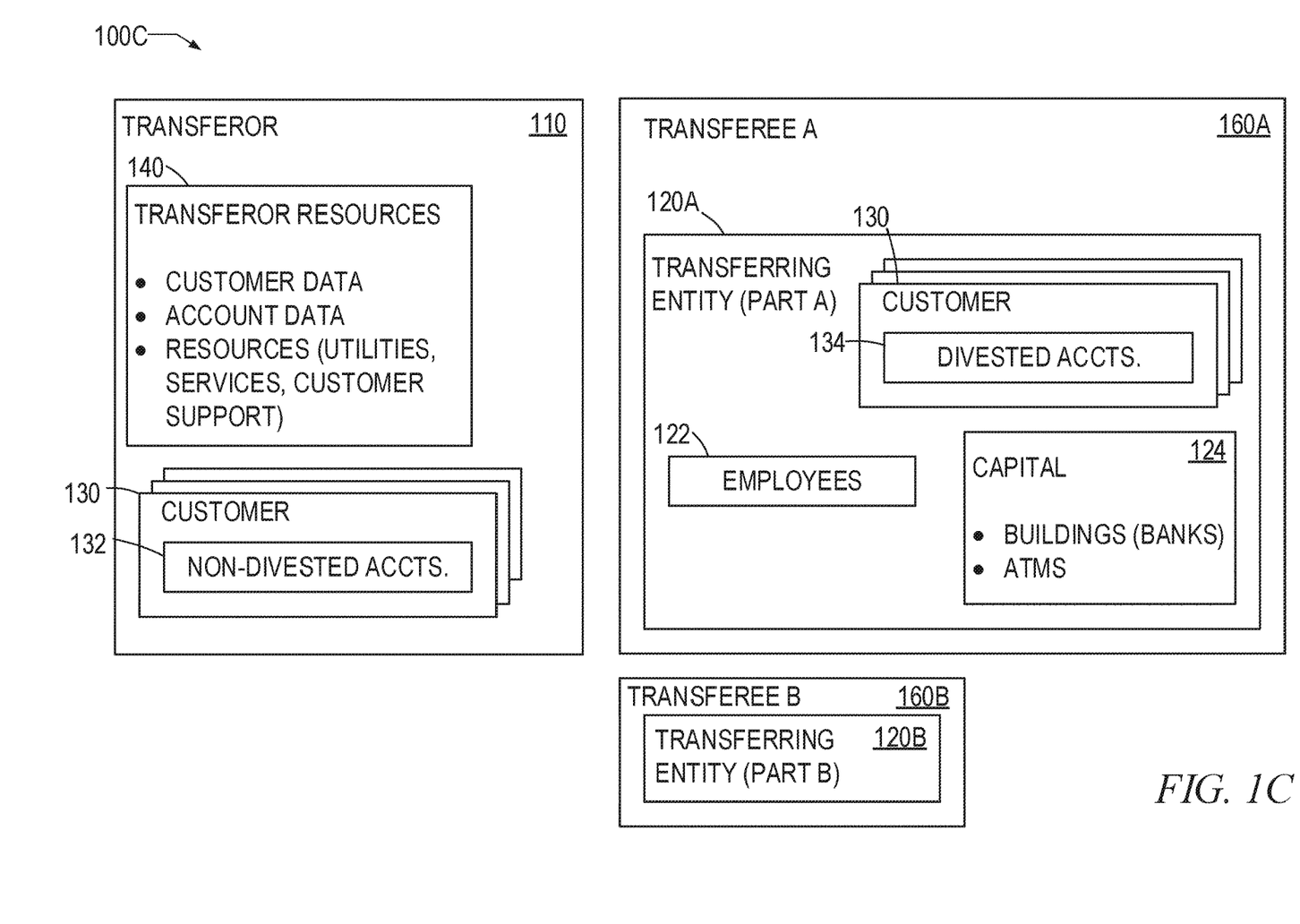
FIG. 1C is a block diagram illustrating an implementation of the sale complete state of the system, according to an aspect.

FIG. 1C is a block diagram illustrating an implementation of the sale complete state of the system 100C in which the divested accounts 134 are fully separated from the transferor 110 with the non-divested accounts 132 remaining with the transferor. The divested accounts 130 along with the employees 122 and capital 124 are now fully associated with and interact exclusively with the transferee 160. This point in time may be specified in the TSA, and the end of the transition state and beginning of the sale complete state may also be referred to as the conversion or de-commission event. The transition services period ends when the transferor 110/surviving bank and the transferee 160/acquiring institution have completed all agreed upon conversion work within the predefined TSAs. At this point, the transferees 160 have the ability to service the newly acquired customers 130 and accounts 134 from their own systems and contact centers. The transferor 110 deactivates access granted to the divested team members of the transferring entity 120 and transferee 160, or anyone else external to the transferor 110 providing support during the transition period. The transferor 110 ensures de-activation of customer 130 and account information for divested accounts 134 within the transferor's 110 systems. other standard post conversion trailing activities may be completed as well. The transferor may continue to service all non-divested accounts 132.

At the sale complete stage, the transferor 110 may perform a final data extraction related to the transferring entity 120 and provide it to the transferee 160. The transferor 110 may complete changes in payment processing routing and complete changes to customer access for each transaction channel. Finally, the transferor 110 may dispose of any technology assets not being sold to the buyer, where applicable.

Figure 2:
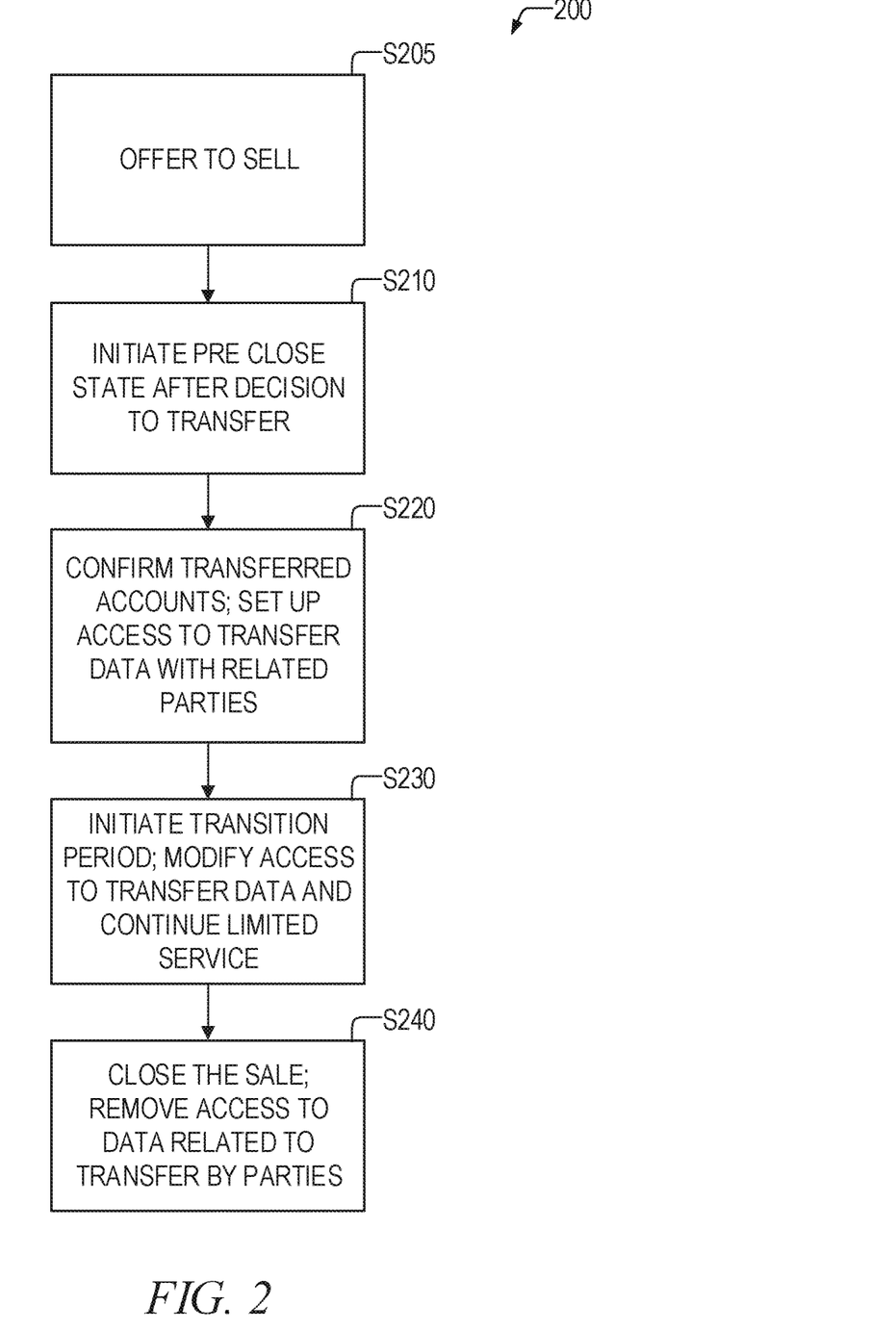
FIG. 2 is a high-level flowchart 200 that illustrates a process flow within the system.

FIG. 2 is a high-level flowchart 200 that illustrates a process flow as described above with respect to FIGS. 1A-1C. In operation S205, the offer to sell is made and the transferring entity(ies) 120 is identified along with the customer accounts to be divested 134. Once a transferee(s) 160 has been identified and initial agreements reached, in operation S210, a pre-close state is initiated in which secure access is provided to limited amounts of information related to the transferring entity 120. In operation S220 a confirmation of the divested accounts 134 is made and access to transfer data with related parties may be provided in, e.g., the VDR.

As the transaction moves forward, in operation S230, the transition period is initiated. During this stage, the transferor 110 may continue to service the divested accounts 134 of the customer 130, but in a limited manner, as described above. The customer 130 may be required to re-enter or re-establish access credentials, and the user interface may be modified (e.g., a non-branded web page) to indicate the status change.

In operation S240, the sale is closed and divestiture is complete. The divested accounts 134 are deactivated on the transferor 110 side and servicing of these accounts is transitioned to the transferee 160. All access to the divested accounts 134 by the transferor 110 is removed and transitional resources may be eliminated.

Figure 3:
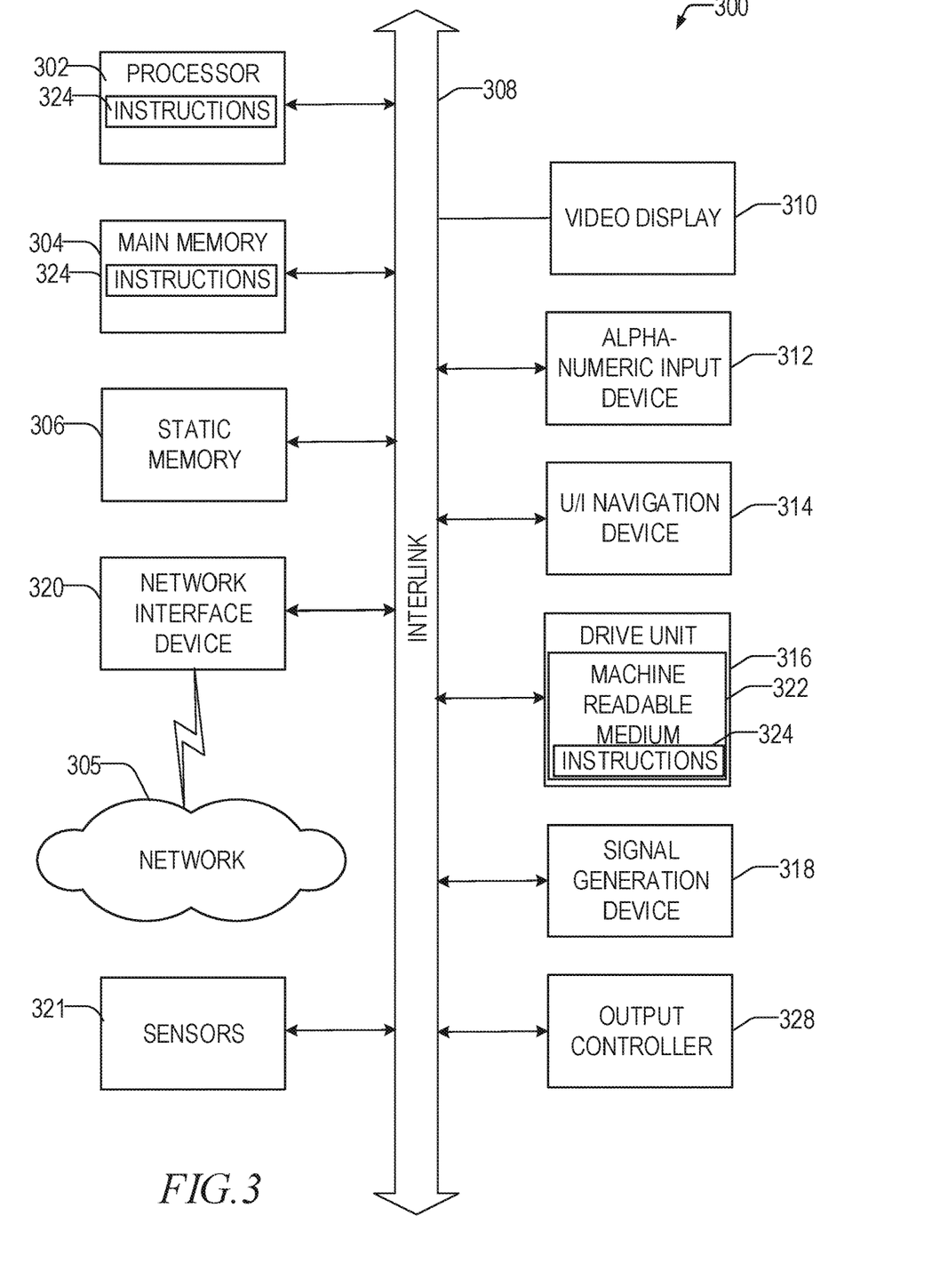
FIG. 3 is a block diagram illustrating a machine that may be a computer on which the various processes described herein may be performed, according to an aspect.

To describe some configurations in greater detail, reference is made to examples of hardware structures and interconnections usable in the designs of the present disclosure. FIG. 3 is a block diagram illustrating a machine that may be a computer on which various processes described herein may be performed, such as a processor of the system 100A, 100B, and 1000 described above. The machine (e.g., computer system) 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The machine 300 may further include a display unit 310, an alphanumeric input device 312 (e.g., a keyboard), and a user interface (UI) navigation device 314 (e.g., a mouse). In an example described herein, the display unit 310, input device 312 and UI navigation device 314 may be a touch screen display. The machine 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 may include an output controller 328, such as a serial (e.g., universal serial bus (USB)), parallel, or other wired or wireless (e.g., infrared(IR), near field communication (NFC), etc. controller connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 324 may further be transmitted or received over the communications network 305 using a transmission medium via the network interface device 320. The term "transmission medium" is defined herein to include any medium that is capable of storing; encoding, or carrying instructions for execution by the machine, and includes digital or analog communications signals or other medium to facilitate communication of such software.

The machine 300 may communicate with one or more other machines 300 utilizing any one of a number of transfer protocols (e.g., frame relay, internet protocol (IP), transmission control protocol (TCP), user datagram protocol (MP), hypertext transfer protocol (HTTP), etc.), Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 300. In an example, the network interface device 320 may include one or more physical jacks (e.g., Ethernet, coaxial, or phone jacks) or one or more antennas to connect to the communications network 326.

In an example, the network interface device 320 may include a plurality of antennas to wirelessly communicate using at least one of single-input multiple-output (SIMO), multiple-input multiple-output (MIMO), or multiple-input single-output (MISO) techniques. In some examples, the network interface device 320 may wirelessly communicate using Multiple User MIMO techniques.

A wide variety of computing devices may constitute a machine 300, as described herein. The following list includes a variety of devices that may fit the definition of a machine 300: a personal data assistant (PDA), a cellular telephone, including a smartphone, a tablet computing device, a laptop computer, a desktop computer, a workstation, a server computer, a mainframe computer, and the like.

Figure 4:
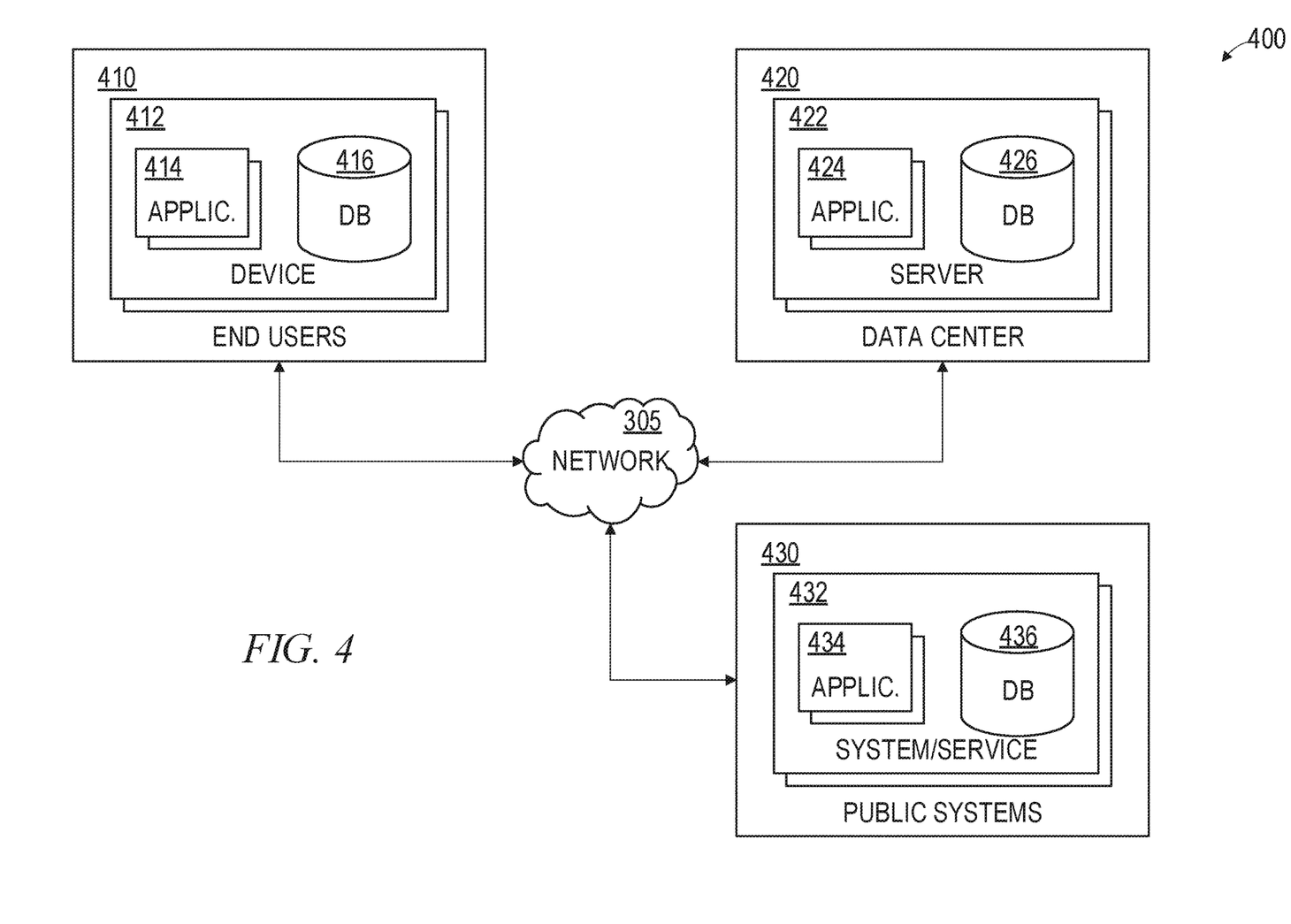
FIG. 4 is a block diagram of a distributed computing system that may be a system in which the computer(s) may operate and in which the various processes described herein may be performed, according to an aspect.

FIG. 4 is a block diagram of a distributed system 400 that may include a client-server architecture or cloud computing system. The system 400 may be a system 100A, 100B, 100C as described above. Distributed system 400 may have one or more end users 410. An end user 410 may have various computing devices 412, which may be machines 300 as described above. The end-user computing devices 412 may comprise applications 414 that are either designed to execute in a stand-alone manner, or interact with other applications 414 located on the device 412 or accessible via the network 405. These devices 412 may also comprise a data store 416 that holds data locally, the data being potentially accessible by the local applications 414 or by remote applications.

The system 400 may also include one or more data centers 420. A data center 420 may be a server 422 or the like associated with a business entity that an end user 410 may interact with. The business entity may be a computer service provider, as may be the case for a cloud services provider, or it may be a consumer product or service provider, such as a retailer. The data center 420 may comprise one or more applications 424 and databases 426 that are designed to interface with the applications 414 and databases 416 of end-user devices 412. Data centers 420 may represent facilities in different geographic locations where the servers 422 may be located. Each of the servers 422 may be in the form of a machine(s) 400.

The system 400 may also include publicly available systems 430 that comprise various systems or services 432, including applications 434 and their respective databases 436. Such applications 434 may include news and other information feeds, search engines, social media applications, and the like. The systems or services 432 may be provided as comprising a machine(s) 400.

The end-user devices 412, data center servers 422, and public systems or services 432 may be configured to connect with each other via the network 405, and access to the network by machines may be made via a common connection point or different connection points, e.g. a wireless connection point and a wired connection. Any combination of common or different connections points may be present, and any combination of wired and wireless connection points may be present as well. The network 405, end users 410, data centers 420, and public systems 430 may include network hardware such as routers, switches, load balancers and/or other network devices.

Other implementations of the system 400 are also possible. For example, devices other than the client devices 412 and servers 422 shown may be included in the system 400. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 422.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other aspects may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as aspects may feature a subset of said features. Further, aspects may include fewer features than those disclosed in a particular example. Thus, the following claims are hereby incorporated into the Detailed Description, with a claim standing on its own as a separate embodiment. The scope of the embodiments and aspects disclosed herein is to be determined with reference to the claims, along with the full scope of equivalents to which such claims are entitled.

The invention claimed is:

1. A computer-implemented method for process control, the method comprising:
   receiving, with a processor, a request from a transferor to transfer an entity from a plurality of entities to a transferee, wherein user data of a user is associated with each entity of the plurality of entities; initiating a pre-transition state, comprising:
   storing the user data in a memory, the user data comprising:
   combined non-divested data and resources that are to remain with the transferor from the plurality of entities; and
   to-be divested data and resources that are associated with the entity and are to remain associated with the entity during and after the transfer, wherein the non-divested data and to-be divested data are segregated in the memory; providing full access to the non-divested and to-be divested data of the user data to the transferor and the user; and
   providing limited access to the to-be divested data of the user data and resources to the transferee;
   initiating a transitional state, comprising;
   providing full access to the non-divested and to-be divested data of the user data to the transferor;
   providing additional limited access to the to-be divested data of the user data and resources by the transferee;
   transmitting the to-be divested data and resources that are associated with the entity to the transferee; and
   in response to initiating the transitional state, providing new access credentials for the to-be divested data and resources that are associated with the entity to the user;
   receiving a request for data associated with the entity from the user, wherein the user provides new$^7$ access credentials associated with the entity;
   and transmitting the to-be divested data to the user.

2. The method of claim 1, further comprising, in the transitional state:
   receiving from the user required new access credentials permitting the user to access the to be divested data; and
   partially restricting access to at least one of the to-be divested data and resources by the user while providing full access to the non-divested data and resources.

3. The method of claim 2, further comprising, in a final state:
   divesting the to-be divested data and resources, making it divested data; and
   removing access to the divested data and resources by the transferor.

4. The method of claim 3, wherein:
   the entity comprises a first entity and second entity;

the transferee comprises a first transferee to which the first entity is to be transferred and a second transferee to which the second entity is to be transferred; and wherein the method further comprises:
restricting access to data of the first entity by the second transferee; and
restricting access to data of the second entity by the first transferee.

5. The method of claim 3, further comprising:
initiating a communication with the user indicating the transfer of the entity.

6. The method of claim 3, wherein:
the non-divested data of the user comprises a non-divested customer account; and
the divested data of the user comprises a divested customer account.

7. The method of claim 3, wherein:
the transferor is a banking company;
the transferee is a financial institution;
the entity comprises regionally defined portfolio of accounts and support structure; and
the user is a banking customer.

8. The method of claim 3, wherein the providing of full access, providing limited access, and removing access are implemented utilizing security provisions of an operating system.

9. The method of claim 7, further comprising, during the transitional state:
periodically or based on an event, providing daily transaction records of the transferor banking company to the transferee financial institution.

10. The method of claim 9, wherein a general ledger records are transaction records.

11. The method of claim 9, wherein the transaction records comprise at least one of one of withdrawal records, deposits, balance inquires, and cashed checks.

12. The method of claim 7, further comprising in the final state, the transferor extracting a final data transmission and providing it to the transferee.

13. The method of claim 7, wherein the entity comprises:
employee data of employees associated with the entity;
capital, comprising buildings and automated teller machines (AIMS); and
the to be divested data.

14. The method of claim 7, further comprising, during the transitional state, requiring a user rescheduling of transfers and specification of bill pay instructions.

15. The method of claim 7, further comprising, during the transitional state, providing transitional state services comprising withdrawal, deposit, transfers, and inquires on their divested accounts at a divested automatic teller machine (ATM), but requiring a change of PIN activity to be performed at a contact center, interactive voice response (IVR), or divested branch.

16. A system for process control comprising:
a hardware processor;
memory including instructions that, when executed by the hardware processor, cause the hardware processor to:
receive a request from a transferor to transfer an entity from a plurality of entities to a transferee, wherein user data of a user is associated with each entity of the plurality of entities;
initiate a pre-transition state, to:
store the user data in the memory comprising combined non-divested data and resources that are to remain with the transferor from the plurality of entities, and to-be divested data and resources that are associated with the entity and are to remain associated with the entity during and after the transfer, wherein the non-divested data and to-be divested data are segregated in the memory;
provide full access to the non-divested and to-be divested data of the user data to the transferor and the user; and
provide limited access to the to-be divested data of the user data and resources by the transferee;
initiate a transition state, to:
provide full access to the non-divested and to-be divested data of the user data to the transferor;
provide additional limited access to the to-be divested data of the user data and resources by the transferee;
transmit the to-be divested data and resources that are associated with the entity to the transferee; and
in response to initiating the transitional state, provide new access credentials for the to-be divested data and resources that are associated with the entity to the user;
receive a request for data associated with the entity from the user, wherein the user provides new access credentials associated with the entity; and
transmit the to-be divested data to the user.

17. The system of claim 16, wherein the system is to, in the transitional state:
receive from the user required new access credentials permitting the user to access the to be divested data; and
partially restrict access to at least one of the to-be divested data and resources by the user while providing full access to the non-divested data and resources.

18. The system of claim 17, wherein the system is to, in a final state:
divest the to-be divested data and resources, making it divested data; and
remove access to the divested data and resources by the transferor.

19. The system of claim 18, wherein:
the entity comprises a first entity and second entity;
the transferee comprises a first transferee to which the first entity is to be transferred and a second transferee to which the second entity is to be transferred;
the system further being configured to:
restrict access to data of the first entity by the second transferee; and
restrict access to data of the second entity by the first transferee.

20. The system of claim 19, wherein:
the transferor is a banking company;
the transferee is a financial institution;
the entity comprises a portfolio of accounts and support structure; and
the user is a banking customer.

21. The system of claim 20, further comprising, during the transitional state:
periodically or based on an event, providing daily transaction records of the transferor banking company to the transferee financial institution.

22. The system of claim 21, wherein a general ledger records are transaction records.

23. The system of claim 20, wherein the entity comprises:
employee data of employees associated with the entity;
capital, comprising buildings, automated teller machines (ATMS), and information technology (IT) and network infrastructure; and the to be divested data.

24. A non-transitory computer-readable storage medium, the computer-readable storage medium including instructions that when executed by a processor, cause the processor to:
- receive a request from a transferor to transfer an entity from a plurality of entities to a transferee, wherein user data of a user is associated with each entity of the plurality of entities;
- initiate a pre-transition state, to:
  - store the user data of the user in memory comprising combined non-divested data and resources that are to remain with the transferor from the plurality of entities, and to-be divested data and resources that are associated with the entity and are to remain associated with the entity during and after the transfer, wherein the non-divested data and to-be divested data are segregated utilizing flags in the memory;
  - provide full access to the non-divested and to-be divested data of the user data to the transferor and the user; and
  - provide limited access to the to-be divested data of the user data and resources by the transferee;
- initiate a transitional state, to:
  - provide full access to the non-divested and to-be divested data of the user data to the transferor;
  - provide additional limited access to the to-be divested data of the user data and resources by the transferee;
  - transmit the to-be divested data and resources that are associated with the entity to the transferee; and
  - in response to initiating the transitional state, provide new access credentials for the to-be divested data and resources that are associated with the entity to the user;
- receive a request for data associated with the entity from the user, wherein the user provides new access credentials associated with the entity; and
- transmit the to-be divested data to the user.

25. The non-transitory computer-readable storage medium of claim 24, wherein:
- the entity comprises a first entity and second entity;
- the transferee comprises a first transferee to which the first entity is to be transferred and a second transferee to which the second entity is to be transferred;
- the instructions further cause the processor to:
- restrict access to data of the first entity by the second transferee; and
- restrict access to data of the second entity by the first transferee.

26. The non-transitory computer-readable storage medium of claim 24, further comprising instructions to:
- receive from the user required new access credentials permitting the user to access the to be divested data; and
- partially restrict access to at least one of the to-be divested data and resources by the user while providing full access to the non-divested data and resources; and
- in a final state:
- divest the to-be divested data and resources, making it divested data; and
- remove access to the divested data and resources by the transferor.

* * * * *

UNITED STATES PATENT AND TRADEMARK OFFICE
CERTIFICATE OF CORRECTION

PATENT NO. : 10,802,745 B1
APPLICATION NO. : 15/636609
DATED : October 13, 2020
INVENTOR(S) : Bozicevich et al.

Page 1 of 1

It is certified that error appears in the above-identified patent and that said Letters Patent is hereby corrected as shown below:

In the Claims

In Column 12, Line 22, in Claim 1, after "entities;", insert --¶--

In Column 12, Line 33, in Claim 1, after "memory;", insert --¶--

In Column 13, Line 43, in Claim 13, delete "(AIMS);" and insert --(ATMS);-- therefor In Column 14, Line 50, in Claim 20, delete "19," and insert --18,-- therefor Signed and Sealed this
Sixteenth Day of February, 2021

Drew Hirshfeld
*Performing the Functions and Duties of the
Under Secretary of Commerce for Intellectual Property and
Director of the United States Patent and Trademark Office*